(12) United States Patent
Ledingham et al.

(10) Patent No.: US 6,287,045 B1
(45) Date of Patent: *Sep. 11, 2001

(54) SPLICE SLEEVE FOR GUIDE RAILS

(75) Inventors: Stuart J. Ledingham, Coto de Caza; Jeffrey J. Schwarz, Whittier, both of CA (US)

(73) Assignee: Valu Engineering, Inc., Irvine, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/452,666

(22) Filed: Dec. 1, 1999

Related U.S. Application Data

(63) Continuation of application No. 08/934,823, filed on Sep. 22, 1997, now abandoned.

(51) Int. Cl.[7] ........................................................ F16B 2/06
(52) U.S. Cl. ...................... 403/306; 403/312; 403/374.3; 198/836.1; 198/836.3
(58) Field of Search ............................... 403/306, 309, 403/310, 312, 373, 374.3; 198/836.1, 836.3

(56) References Cited

U.S. PATENT DOCUMENTS

| 229,670 | 7/1880 | Carrick . | |
|---|---|---|---|
| 930,870 | 8/1909 | Lewis . | |
| 3,059,589 | 10/1962 | Schreyer . | |
| 4,958,725 | * 9/1990 | Meade et al. | 198/836.1 |
| 5,492,218 | * 2/1996 | Falkowski | 198/836.3 |
| 5,533,826 | * 7/1996 | Cairns | 198/836.3 X |
| 5,626,221 | * 5/1997 | Ledingham | 198/836.3 |
| 5,676,239 | * 10/1997 | Mason | 198/836.1 |
| 5,701,991 | * 12/1997 | Helmetsie | 198/836.3 |
| 5,782,339 | * 7/1998 | Drewitz | 198/836.3 |
| 5,803,687 | * 9/1998 | Ledingham | 198/836.3 X |
| 5,896,980 | * 4/1999 | Butler | 198/836.3 |
| 5,927,480 | * 7/1999 | McCaffrey et al. | 198/836.3 |
| 6,053,654 | * 4/2000 | Ledingham | 403/306 |

FOREIGN PATENT DOCUMENTS

| 489838 | 8/1938 | (GB) . |
|---|---|---|
| 335904 | 3/1959 | (SE) . |

* cited by examiner

Primary Examiner—Lynne H. Browne
Assistant Examiner—David E. Bochna
(74) Attorney, Agent, or Firm—Knobbe, Martens, Olson & Bear LLP

(57) ABSTRACT

A guide rail splice sleeve provides for adjustable housing, gripping, and connecting of sequential guide rail segments. The device includes an elongated central member, first and second tension bars detachably connected to the central member at opposite ends thereof, and fastening elements for securely connecting the first and second tension bars independently to the central member. The independent connection of each tension bar to the central member permits sequential guide rail segments to be gripped or adjusted independently of the other. Additionally, the sleeve may include a hand tightening device so that the fastening elements may be adjusted without the need for tools. Also, the sleeve may include an extension for spanning any gap between non-abutting ends of adjacent guide rail segments.

22 Claims, 8 Drawing Sheets

SPLICE SLEEVE FOR GUIDE RAILS

RELATED APPLICATION

This application is a continuation of U.S. patent application Ser. No. 08/934,823, filed on Sep. 22, 1997 abandoned.

BACKGROUND OF THE INVENTION

1. Field of the Invention

The present invention relates in general to guide rail assemblies used in assembly line and conveyor belt systems and, in particular, to a means for adjustably housing, gripping and connecting sequential conveyor guide rails.

2. Description of the Related Art

Clamps are commonly used to grip and connect guide rails which direct the travel of articles along a predetermined path of an assembly line or conveyor system. The articles are conveyed on a belt or track during the processing and packaging procedures of a typical manufacturer. Dependable fixation and alignment of the guide rails is important to ensure manufacturing efficiency and to minimize damage of the articles from inappropriate contact with the guide rails. Guide rail length is customized to conveyor length by the sequential alignment and connection of guide rail segments.

Early guide rail housing, gripping, and connecting means were characterized by a cross bar that incorporated a clamping device, as illustrated in FIG. 1. Abutting guide rails were then connected and secured to the cross bar by the clamping device. Clips and other retention means were also used to secure abutting guide rails. An advantage of incorporating a clip with a nut and bolt clamping device is that the nut is more easily rotated onto the bolt without causing simultaneous rotation of the bolt. That is, integral bolts eliminate the need to grasp the bolt in order to prevent its rotation while rotating the nut onto the bolt shaft. However, a disadvantage of clips formed with or without the bolt is that they tend to rotate out of position about the pivot point formed by the bolt in the cross bar, thereby causing misalignment of the guide rail in the conveyor system.

The device shown in FIG. 2 is exemplary of a recent development in the guide rail housing, gripping and connecting field. This device comprises upper and lower L-shaped cross bars of equal length. The upper and lower cross bars are inversely aligned to form a C-shaped groove section wherein abutting guide rails are housed and secured. The upper and lower cross bars are detachably connected by a nut and bolt retention device to allow adjustment of the guide rails.

However, the prior art devices all have significant deficiencies. Specifically, once abutting guide rail segments are connected, any subsequent alteration of either guide rail segment (due to setup, modification, replacement, etc.) is difficult because, when the retention means is loosened, both guide rail segments become loose. This results in at least three loose parts. Therefore, the task of altering a guide rail segment requires either two operators or one operator with significant difficulty and awkwardness. A second problem with the prior art resulted because the abutting guide rail segments are secured by only a single retention mechanism. Thus, whenever the single retention mechanism is loosened to alter a guide rail segment, the abutting guide rail segment is correspondingly loosened.

A need therefore exists for a means for adjustably housing, gripping and connecting sequential guide rails that is easily adjustable and does not possess the disadvantages of the prior art.

SUMMARY OF THE INVENTION

In accordance with one aspect of the present invention, a splice sleeve device incorporates a dual retention means to overcome the deficiencies of the prior art by enabling a guide rail segment to be loosened and adjusted while the device securely holds a sequential guide rail segment.

In the preferred embodiment, the sleeve comprises an elongated central member, a first tension bar, a second tension bar, and a retention means corresponding to each tension bar permitting selective adjustment of the respective tension bar to the central member for tightening or loosening adjacent guide rail segments.

The first retention means comprises engaging the first tension bar and central member with one or more fasteners. So connected, these members form a channel for gripping a first guide rail segment positioned therein.

The second retention means is similarly formed by engaging the second tension bar and central member with one or more fasteners. So connected, these members form a channel for gripping a second guide rail segment positioned therein.

The first and second guide rail retention means may be independently loosened or tightened, whereby adjustments may be made to the position of either guide rail segment independently from the other guide rail segments Thus, the dual retention means permits an operator to loosen one tension bar in order to loosen the corresponding guide rail. The other tension bar remains undisturbed and accordingly the other sequential guide rail remains securely connected to the splice sleeve. This design enables a single operator to adjust, modify, or slide the position of a guide rail without the above mentioned disadvantages inherent in the prior art.

In one preferred embodiment, the sleeve incorporates a hand tightening device with a ratcheting mechanism into the retention means so that the retention means may be tightened or loosened without the assistance of additional tools or devices.

In another preferred embodiment, an extension guide rail is provided which spans a space between the first and second tension bars or guide rails positioned therein. This provides additional precision in the alignment of guide rails, eliminating any gap between adjacent guide rail ends and decreasing the likelihood that articles being transported by the conveyor system will be disrupted in their travel or damaged as a result of encountering an exposed end of one of the adjacent guide rail segments.

Further advantages and applications will become apparent to those skilled in the art from the following detailed description and the drawings referenced herein.

DETAILED DESCRIPTION OF THE PREFERRE EMBODIMENTS

Figure 1:
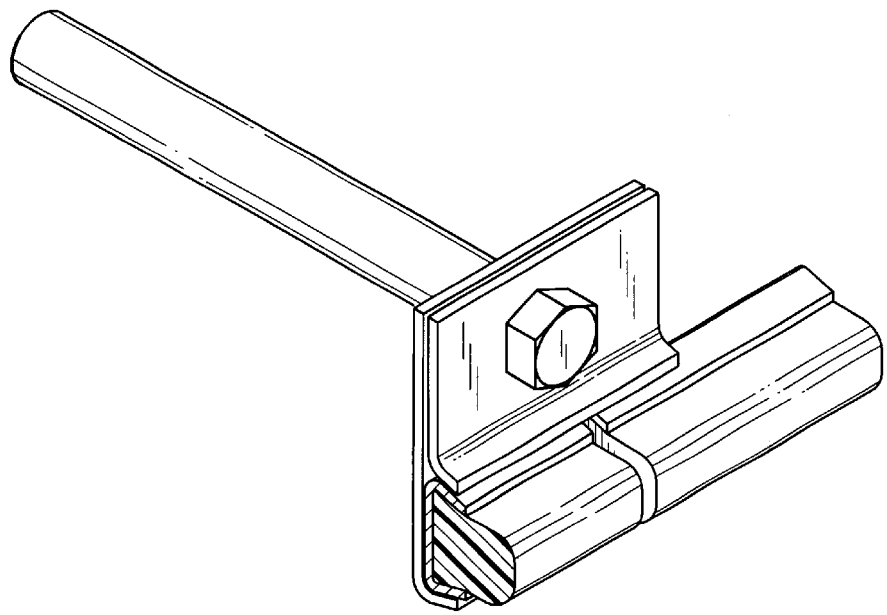
FIG. 1 is a front perspective view of a first prior art guide rail housing, gripping, and connecting device.
Figure 2:
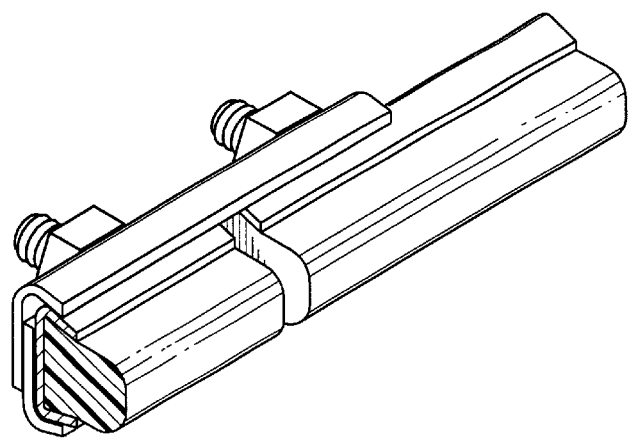
FIG. 2 is a front perspective view of a second prior art guide rail housing, gripping, and connecting device.
Figure 3:
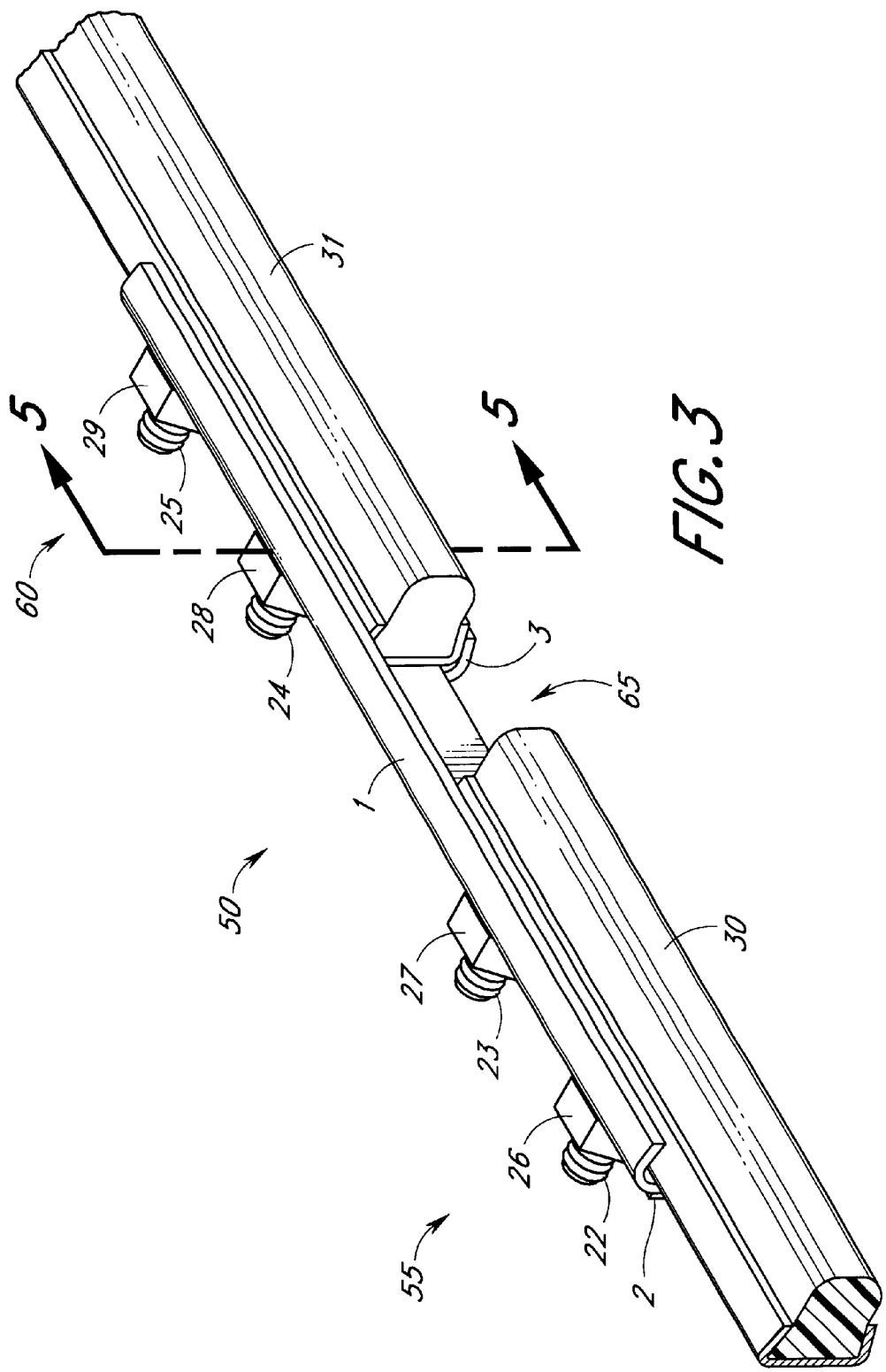
FIG. 3 is a front perspective view of a splice sleeve constructed in accordance with the teachings of the invention as connected to sequential guide rail segments.
Figure 4:
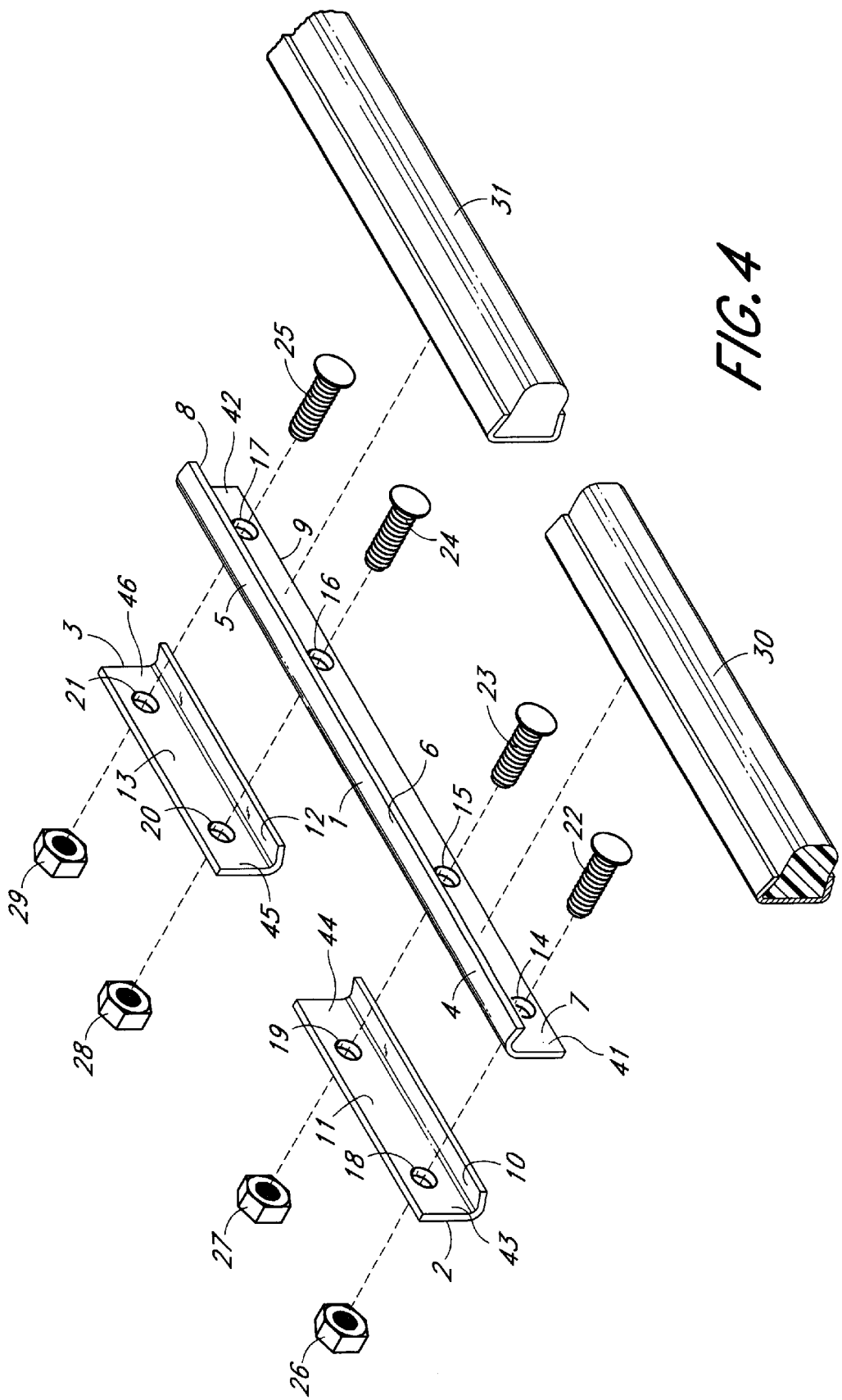
FIG. 4 is an exploded front perspective view of the splice sleeve illustrated in FIG. 3.

Referring to the drawings, and particularly to FIGS. 3 and 4 thereof, there is illustrated a guide rail splice sleeve 50 in accordance with the present invention. In general, the guide rail splice sleeve 50 is adapted to detachably receive two adjacent guide rail segments 30,31 in a manner whereby either guide rail segment may be attached, detached, adjusted, moved or slid independent of the other segment.

Referring still to FIGS. 3 and 4, the guide rail splice sleeve 50 in accordance with the present invention preferably includes an elongated central member 1, a first tension bar 2 detachably connected to a first end 4 of the central member 1, a second tension bar 3 detachably connected to a second, opposite end 5 of the central member 1, and two retention means 55,60 which secure the tension bars 2,3 to the central member 1 as well as tighten or loosen corresponding guide rail segments 30,31 when placed between the central member 1 and tension bars 2,3.

The sleeve 50 preferably includes an elongated central member 1. The central member 1 is constructed in a substantially L-shaped design, having a first or top section 6 with a front edge 8 and a downwardly extending second or vertical section 7 with a bottom edge 9. These two sections 6,7 form an angle α of approximately 90 degrees as measured therebetween. The member 1 has a first end 4 and an opposing second end 5.

The sleeve 50 includes a first tension bar 2 constructed in a substantially L-shaped design, having a first or bottom section 10 and an upwardly extending second or vertical section 11. These two sections 10,11 form an angle β of approximately 80 degrees as measured therebetween. The first tension bar 2 is preferably less than one-half half the length of the central member 1 and is arranged, as described in more detail below, to be detachably connected to the first end 4 of the central member 1. When so connected, the end 43 of the first tension bar 2 and the end 41 of the first end 4 of the central member 1 both preferably terminate along the same plane. That is, both ends 41,43 are preferably flush.

The sleeve 50 includes a second tension bar 3 constructed in a similar manner as the first tension bar 2 to define a substantially L-shaped design, having a first or bottom section 12 and an upwardly extending second or vertical section 13. These two sections 12,13 form an angle γ of approximately 80 degrees as measured therebetween. The second tension bar 3 is preferably less than one half the length of the central member 1 and is arranged, as described in more detail below, to be detachably connected to the second end 5 of the central member 1. When so connected, the end 46 of the second tension bar 3 and the end 42 of the second end 5 of the central member 1 both preferably terminate along the same plane That is, both ends 42,46 are preferably flush.

Of course, it will be easily understood by those skilled in the art that the ends 43,46 of the first and second tension bars 2,3 do not need to be flush with the ends 41,42 of the central member I to accomplish the purposes of the present invention. Moreover, the angles α, β, and γ may be altered to accommodate guide rails of various shapes and sizes known in the art.

The first and second tension bars 2,3 may be interchangeable and are distinguished herein only for clarity purposes. Because the tension bars 2,3 preferably have a length which is less than one half the length of the central member 1 and one end 43,46 of each tension bar 2,3 is preferably arranged to be flush with an end 41,42 of the central member 1, a central portion 65 is created between the interior ends 44,45 of the first and second tension bars 2,3 (see FIG. 3).

A first retention means 55 is provided for detachably securing the first tension bar 2 to the first end 4 of the central member 1. Preferably, this means includes one or more fastening devices for engaging the first end 4 of the central member 1 and the first tension bar 2. This engagement is achieved by aligning holes 14,15 (FIG. 4) through the vertical section 7 of the central member 1 with corresponding holes 18,19 in the vertical section 11 of the first tension bar 2.

When the holes 14,15 in the first end 4 of the central member 1 are aligned with the holes 18,19 in the first tension bar 2, a fastening device 22,23 may be passed or inserted through the aligned holes 14,15,18,19. When fastened, the end 41 of the first end 4 of the central member 1 and the end 43 of the first tension bar 2 remain preferably flush.

A second retention means 60 is similarly provided for detachably securing the second tension bar 3 to the second end 5 of the central member 1. Preferably, this means includes one or more fastening devices for detachably engaging the second end 5 of the central member 1 with the second tension bar 3. This engagement is achieved by aligning holes 16,17 in the vertical section 7 of the central member 1 with holes 20,21 in the vertical section 13 of the second tension bar 3.

When the holes 16,17 in the second end 5 of the central member 1 are aligned with the holes 20,21 in the second tension bar 3, a fastening device 24,25 may then be inserted through the aligned holes 16,17,20,21. When fastened, the end 46 of the second end 5 of the central member I and the end 42 of the second tension bar 3 are preferably flush.

Of course, it will be easily understood by those skilled in the art that the ends 43,46 of the first and second tension bars 2,3 do not need to be flush with the ends 41,42 of the central member 1 to accomplish the purposes of the present invention. Similarly, the first and second tension bars 2,3 need not be in any particular order and may be interchanged. Moreover, there is no requirement that the first and second ends 4,5 of the central member 1 and the first and second tension bars 2,3 have precisely two holes. Rather, the central member 1 or the tension bars 2,3 may have one or more holes, regardless of the number of holes which the other elements (central member 1 and tension bars 2,3) have. Additionally, it is contemplated that the retention means 55,60, preferably a bolt 22,23,24,25, may be permanently affixed to either the central member 1 or the tension bars 2,3 as will easily be understood by those skilled in the art.

Figure 7:
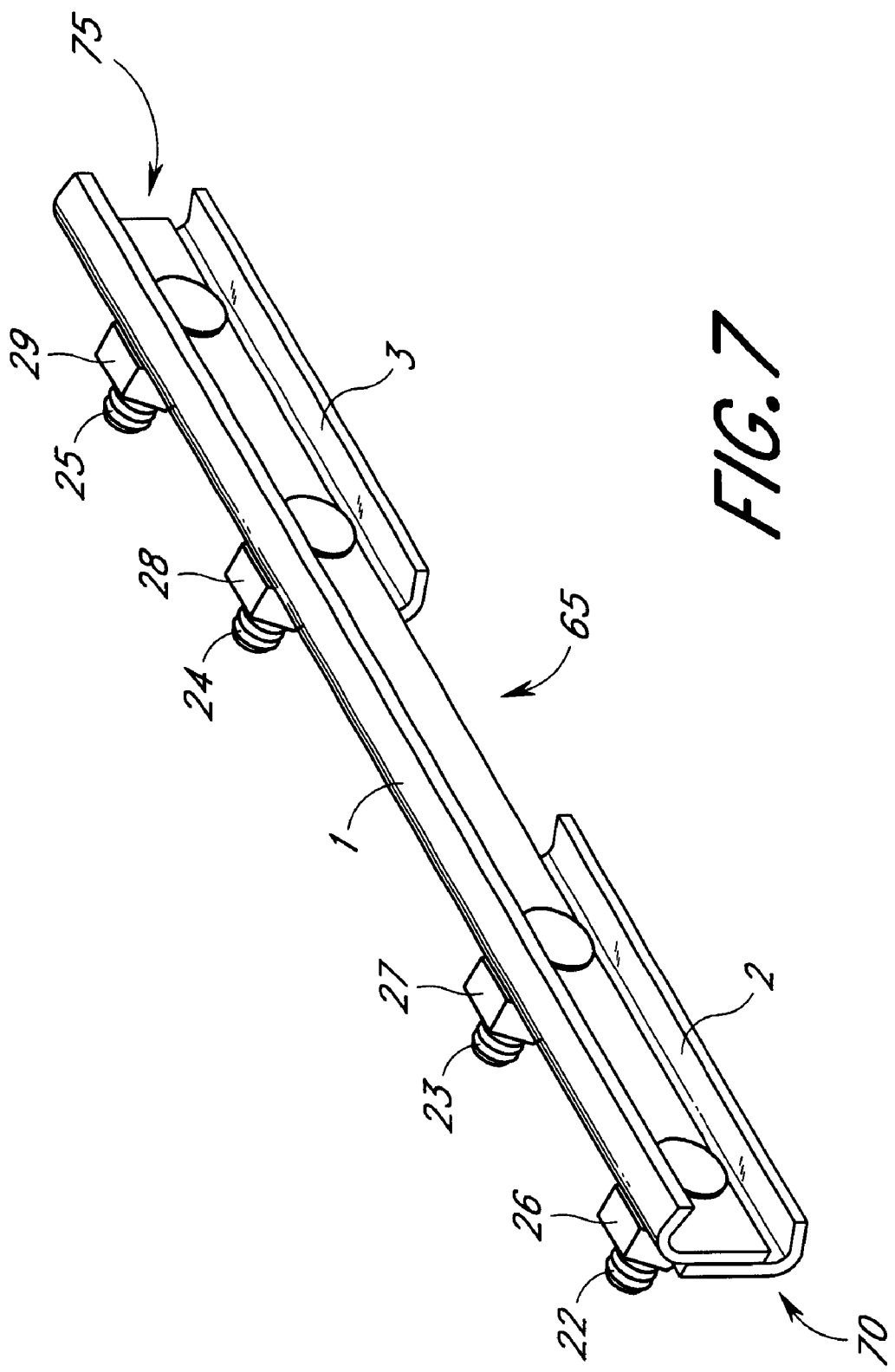
FIG. 7 is a front perspective view of the splice sleeve illustrated in FIG. 3 prior to the introduction of the guide rails.

A first guide rail channel 70 is formed when the first tension bar 2 is secured to the central member 1 as described above. As illustrated in FIG. 7, when so arranged, these members 1,2 cooperate to define a channel 70 characterized by a 90 degree angle α between the top section 6 and downwardly extending vertical section 7 of the first end 4 of the central member 1 and an 80 degree angle β between the bottom section 10 and upwardly extending vertical section 11 of the first tension bar 2. More specifically, the top section of the channel 70 is formed by the top section 6 of the first end 4 of the central member 1, the bottom section of the channel 70 is formed by the bottom section 10 of the first tension bar 2, and the vertical section of the channel 70 is formed by the overlapping downwardly extending vertical section 7 of the first end 4 of the central member 1 and the upwardly extending vertical section 11 of the first tension bar 2. The channel 70 thereby formed is adapted to receive a first guide rail 30.

A second guide rail channel 75 is similarly formed by the attachment of the second tension bar 3 to the central member 1 at its second end 5 as described above. So arranged, these members 1,3 cooperate to define a channel 75 characterized by a 90 degree angle α between the top section 6 and downwardly extending vertical section 7 of the second end 5 of the central member 1 and an 80 degree angle γ between the bottom section 12 and upwardly extending vertical section 13 of the second tension bar 3. More specifically, the top section of the channel 75 is formed by the top section 6 of the second end 5 of the central member 1, the bottom section of the channel 75 is formed by the bottom section 12 of the second tension bar 3, and the vertical section of the channel 75 is formed by the overlapping downwardly extending vertical section 7 of the second end 5 of the central member 1 and the upwardly extending vertical section 13 of the second tension bar 3. The channel 75 formed thereby is adapted to receive a second guide rail 31.

As stated above, the two retention means 55, 60 are provided for detachably securing the first and second tension bars 2,3 to the respective ends 4,5 of the central member 1. When tightened, each retention means also acts to grip and secure a guide rail segment 30,31 positioned within the channel 70,75. This gripping ability results the relationship between each tension bar 2,3 and the central member 1, as will be easily understood by those skilled in the art.

Preferably, a conventional nut and bolt is used to adjust the gripping force, thus allowing for selective tightening or loosening of a guide rail segment 30,31 in the sleeve 50. More specifically, in accordance with the preferred embodiment, a flat headed bolt 22,23,24,25 is passed through the vertical section 7,11,13 of the channel 70,75, with the flat head portion of the bolt 22,23,24,25 resting against the inside vertical section 7 of the central member 1 defining a portion of the channel 70,75. A nut 26,27,28,29 is then threaded onto that portion of the bolt 22,23,24,25 extending through the sleeve 50 to its opposite side. Tightening of each nut 26,27,28,29 creates an inwardly directed force onto the top 6 and bottom 10,12 of the guide rail housing area. This force secures a guide rail 30,31 when accepted into the channel 70,75 as will be understood by those skilled in the art. Selective tightening or loosening of the nut and bolt fastening device accordingly grips or releases the guide rail 30,31.

It may now be understood that when the fastening means are loose, each tension bar 2,3 may move with respect to the central member 1, such that each channel 70,75 is larger than a guide rail segment 30,31 positioned therein. In this state, the segments 30,31 are readily inserted into or removed from the channel 70,75. This allows the first guide rail 30 to be adjusted, moved, or slid while the second guide rail 31 remains secure, or, alternatively, this allows the second guide rail 31 to be adjusted, moved, or slid while the first guide rail 30 remains secure. Additionally, both guide rails 30, 31 may be simultaneously adjusted, moved, or slid.

Figure 5:
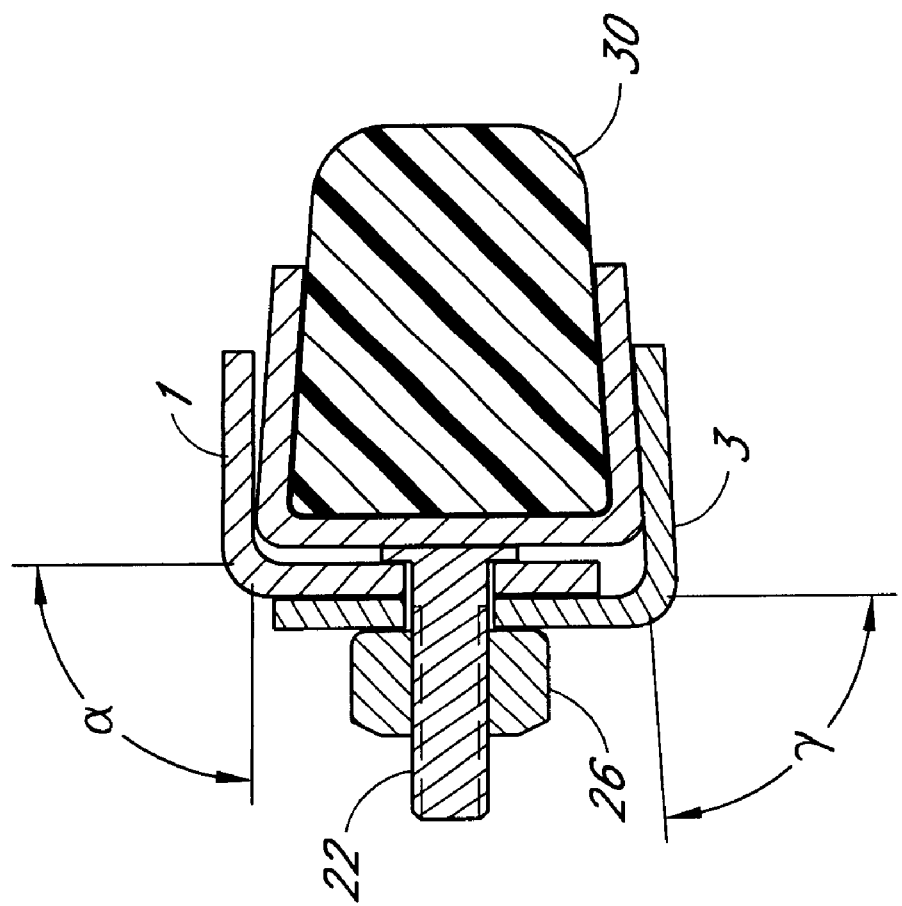
FIG. 5 is a cross sectional view of the splice sleeve illustrated in FIG. 3 taken along lines 5—5 of FIG. 3.

When, however, the fastening means are tightened (as by tightening the nuts 26,27,28,29 in the embodiment illustrated in FIGS. 3 and 4, and cross sectionally viewed in FIG. 5) the upwardly extending sections 11,13 of the first and second tension bars 2,3 are brought into rigid contact with the vertical section 7 of the central member 1. When so tightened, because the outwardly extending portion 10,12 of each tension bar 2,3 extends upwardly at an angle of less than 90 degrees (80 degrees, approximately), this portion of the sleeve presses upwardly or "inwardly" towards the top section 6 of the central member 1, thus tightly squeezing and securing the guide rail segment 30,31 positioned therebetween.

As may also now be understood, the sleeve 50 of the present invention permits a user to selectively tighten or loosen the adjacent guide rail segments 30,31 independently of one another. For example, the user may loosen the retention means 55 second thereby, the first tension bar 2 and thus release a guide rail segment 30 secured thereby, without disturbing the secure connection of the sleeve to the second guide rail segment 31, or vice versa. Advantageously, one guide rail may thus adjust, move, or slide away from or towards another guide rail which remains secured in the sleeve 50.

Figure 6:
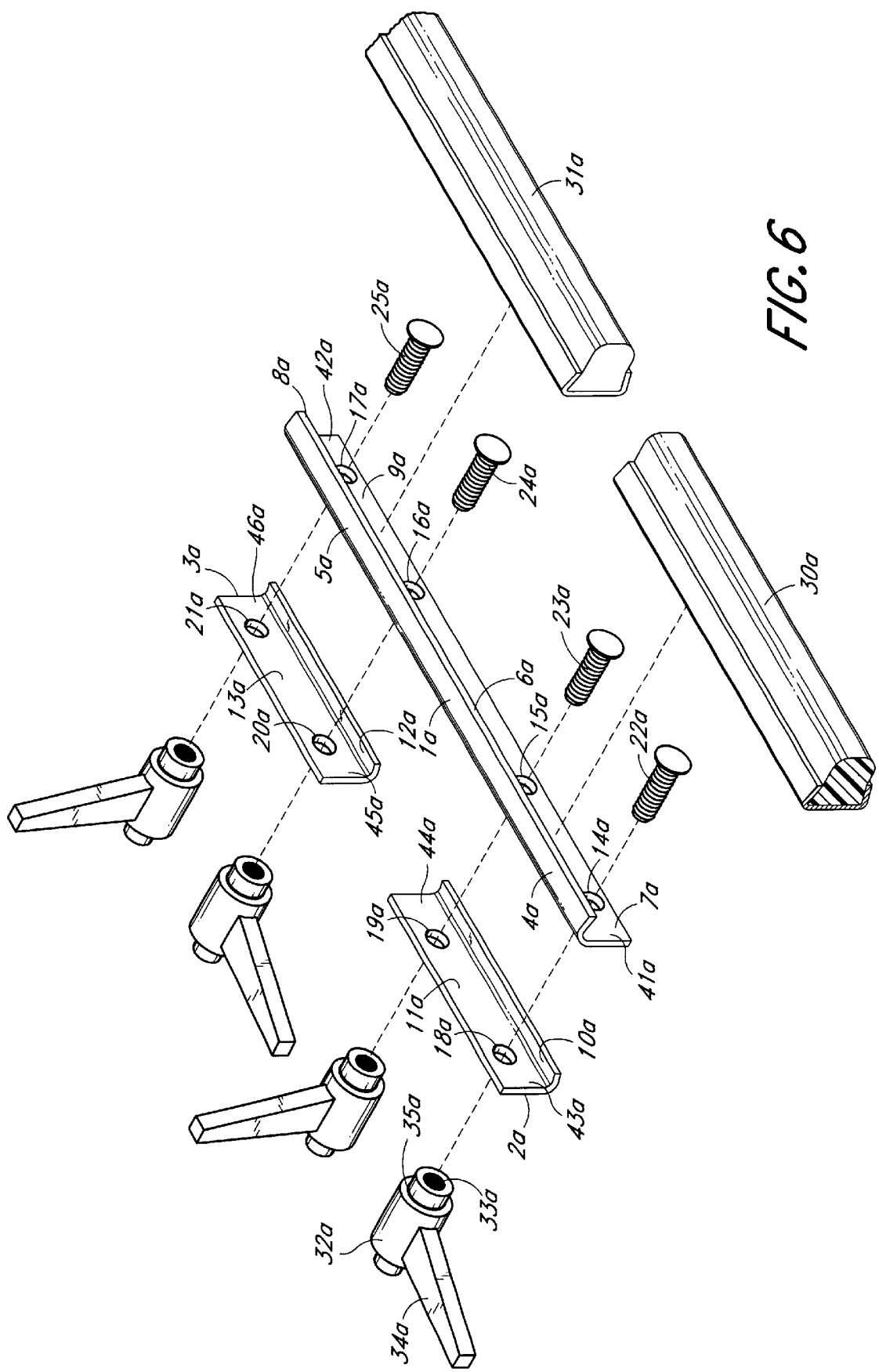
FIG. 6 is an exploded front perspective view of the splice sleeve illustrated in FIG. 4 incorporating a hand tightening device.

In accordance with a second embodiment of the present invention, and referring to FIG. 6, the sleeve 50 incorporates a hand tightening device 32a in the retention means. This embodiment of the invention is similar to that described above and illustrated in FIGS. 3–5, and as such, like reference numerals have been given to similar parts, except that an "a" designator has been appended thereto.

The hand tightening device 32a is preferably constructed of molded plastic and comprises a thread portion 33a and a handle portion 34a. The thread portion 33a receives a bolt 22a, which is inserted through the vertical section 7a of the central meter 1a. The bolt 22a threadingly engages with the thread portion 33a to form a conventional nut and bolt device. That is, clockwise rotation of the thread portion 33a urges the device 32a toward the bolt 22a, thereby tightening the retention means, and counterclockwise rotation of the thread portion 33a urges the device 32a away from the bolt 22a, thereby loosening the retention means. The handle portion 34a partially houses the thread portion 33a and extends radially to form a handle by which an operator may grip and rotate the device 32a. A ratchet mechanism 35a lies between the thread portion 33a and the handle portion 34a to allow rotation of the device 32a in confined areas.

This arrangement is advantageous since it allows a user of the guide rail sleeve of the present invention to make adjustments without the need for a wrench or similar tool to tighten or loosen the fastening and gripping means.

Of course, it will be easily understood by those skilled in the art that other retention means may be used other than the hand tightening device 32a illustrated in the preferred embodiment to accomplish the purposes of the present invention. Moreover, the present invention contemplates interchangeable use of the hand tightening device 32a and other fastening means on a sleeve 50. That is, a sleeve 50 may incorporate one or more hand tightening devices 32a and one or more other fastening devices such as screws and bolts.

Figure 8:
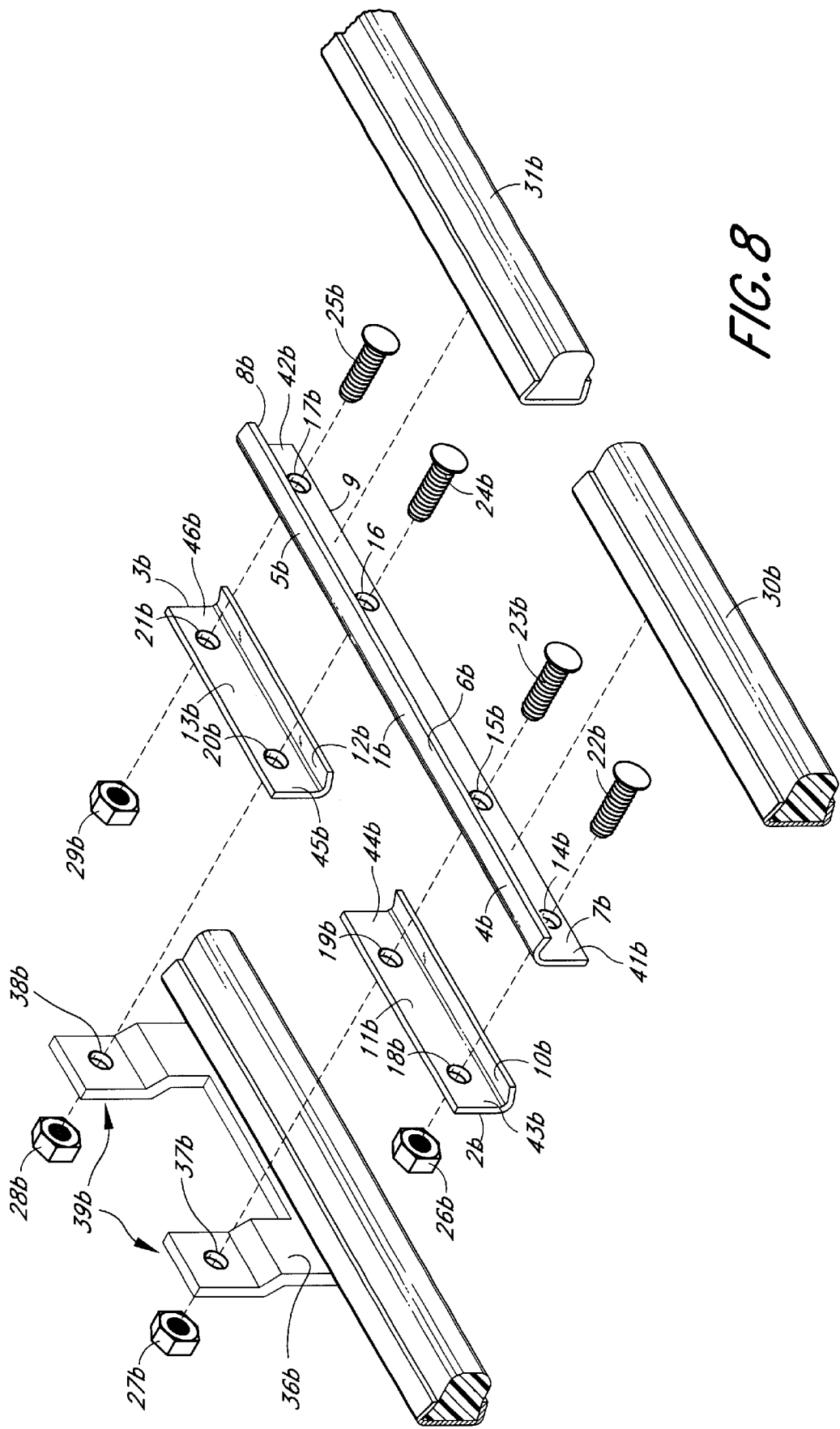
FIG. 8 is an exploded front perspective view of the splice sleeve illustrated in FIG. 4 with an extension guide rail attached.
Figure 9:
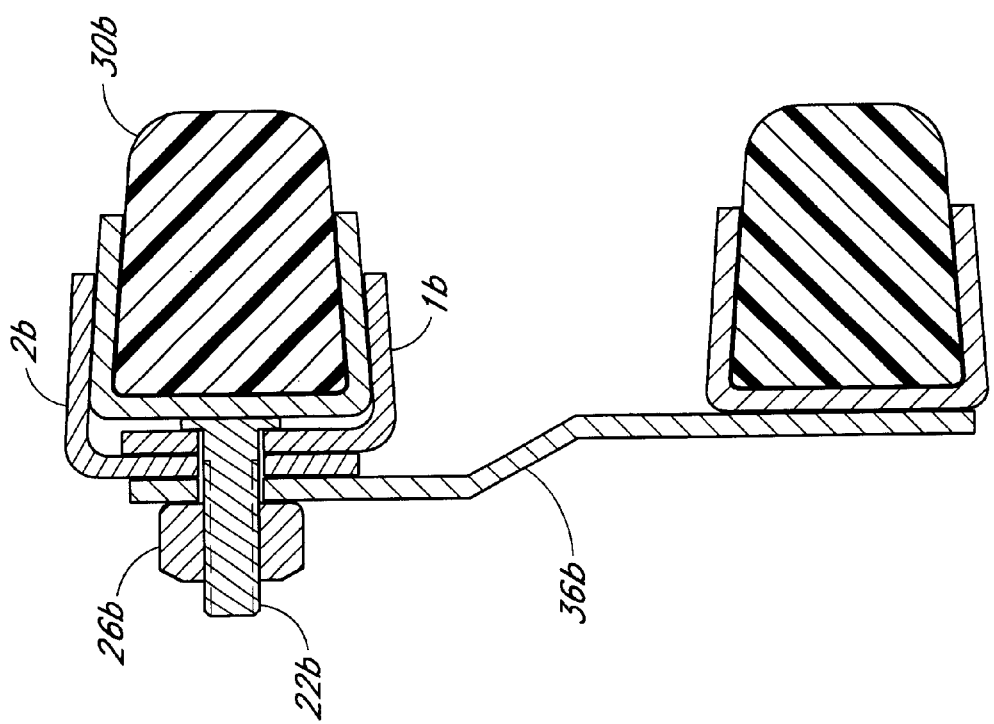
FIG. 9 is a cross sectional view of the splice sleeve illustrated in FIG. 5 with an extension guide rail attached.

Another preferred embodiment of the present invention is illustrated in FIGS. 8 and 9. This embodiment of the invention is similar to that described and illustrated above, and as such, like reference numerals have been given to similar parts, except that a "b" designator has been appended thereto.

In this embodiment, the sleeve preferably incorporates an extension guide rail 36b removably secured to the central member 1b and arranged to span any gap between the first and second tension bars 2b, 3b. Attachment of the extension 36b to the central member 1b is accomplished by aligning holes 37b,38b passing through a mounting portion 39b of the extension 36b with interior holes 15b,16b in the central member 1b. When aligned, a bolt 23b,24b or similar fastening element is inserted through the holes 15b,16b,37b, 38b, securing the extension guide rail 36b beneath the sleeve 50b.

As may be appreciated, if the ends of two adjacent guide rail segments 30b,31b do not meet at the sleeve connection, a space exists therebetween. Items moving along a conveyor which encounter this gap may become lodged within the gap against an end of the guide rail segment. In addition, the guide rail end may damage packaging or the like.

In accordance with the present invention, the extension 36b serves as a "bridge" between the spaced guide rail segments 30b,31b so that an effective continuous guide rail is provided. The extension 36b may be arranged to include a plastic guide section facing inwardly towards the items moving along the conveyor, or other arrangement similar to the guide rails currently in use as will be understood by those skilled in the art.

It is also noted that while the guide rail extension 36b is preferably positioned below the sleeve 50b, it is possible to mount the extension 36b above the sleeve 50b, as long as in the particular application in which the extension is used the extension remains in a position for engagement with the items on the conveyor. audition, the extension 36b may have length which is greater than the spacing between the inwardly facing ends of the tension bars 2b,3b, but the length is preferably less than the overall length of the central member 1b. In this fashion, the extension 36b serves its intended purpose even if the gap between the ends of adjacent rails is larger than the space between the tension bars 2b,3b. Generally, however, the gap between adjacent rails, rarely exceeds two inches in length.

Referring to FIGS. 3 and 4, in the preferred embodiment, the members 1,2,3 are all constructed of stainless steel. Stainless steel is chosen for its strength, low cost, and ability to be easily cleaned, which are commonly required of guide rail mounting devices used in assembly line operations. The ability to be easily cleaned becomes especially important when the sleeve is used in food preparation situations. Moreover, stainless steel can be polished to a smooth surface which assists conveyor operations. However, there is no requirement that stainless steel be used. Rather, other metals, plastics, composites, or other similar materials may be used depending on the requirements which are demanded of the sleeve 50.

In the preferred embodiment, the central member 1 is approximately eight inches in length, with a top section 6 width of approximately three eighths of an inch, and a downwardly extending vertical section 7 width of approximately one half of an inch. The first and second tension bars 2,3 are both approximately three inches in length with a bottom section 10,12 width of approximately three eighths of an inch, and an upwardly extending vertical section 11,13 width of approximately one half of an inch. The holes 14,15,16,17,18,19,20,21 extending through the central member 1 and the first and second tension bars 2,3 are approximately three eighths of an inch in diameter. The threaded bore through each nut 26,27,28,29 and the threaded shaft of each bolt 22,23,24,25 are also approximately three eighths of an inch in diameter and of conventional design. As known to those skilled in the art, however, the specific sizes of these members may be varied based on the particular application thereof. For example, conveyor systems such as for large products, such as automobile parts, may tend to require larger specifications while conveyor systems for smaller products, such as electronics parts, may tend to require smaller specifications.

In audition, while the fastening means desired above have been described as an engaging nut and bolt and hand tightening device, other fasteners are contemplated. For example, the fasteners may comprise clamps or clips. Also, threaded shafts may extend from each tension bar 2,3 and be formed integrally therewith for passing through corresponding holes in the central member 1, thus eliminating the need for separate bolts and the holes through the tension bars. Alternatively, the threaded shafts may be integral with and extend from the central member 1 which will be understood by those of skill in the art.

While in the preferred embodiment the ends 41,42 of the central member 1 and an end 43,46 of each tension bar 2,3 are arranged to be flush when these members are connected, it is contemplated that the ends 41,42,43,46 are not flush. For example, the central member 1 may have its end 41,42 extend beyond the end 43,46 of either or both tension bars 2,3 connected thereto.

The embodiments illustrated and described above are provided merely as examples of the sleeve 50 constructed in accordance with the present invention. Other changes and modifications can be made from the embodiments presented herein by those skilled in the art without departure from the spirit and scope of the invention, as defined by the appended claims.

What is claimed is:

1. A splice sleeve for selectively connecting sequential first and second guide rails, comprising:
   an elongated central member for engaging a first portion of a first guide rail and a first portion of a second guide rail;
   a first tension bar for engaging a second portion of the first guide rail;
   a second tension bar for engaging a second portion of the second guide rail;
   a first connector removably connecting the central member and first tension bar to securely engage the first guide rail; and
   a second connector removably connecting the central member and second tension bar to securely engage the second guide rail, said first and second tension bars being positioned with their respective ends adjacent to each other such that they are substantially co-linear along a longitudinal axis.

2. The splice sleeve of claim 1 wherein the first connector includes at least one bolt.

3. The splice sleeve of claim 1 wherein the second connector includes at least one bolt.

4. The splice sleeve as claimed in claim 2 wherein the central member includes at least one hole passing therethrough for alignment with at least one hole passing through said first tension bar through which said bolt extends.

5. The splice sleeve as claimed in claim 3, wherein the central member includes at least one hole passing therethrough for alignment with at least one hole passing through said second tension bar through which said bolt extends.

6. The splice sleeve as claimed in claim 1 wherein said central member is generally "L"-shaped having a first horizontal section for engaging said first portion of said first and second guide rails and a second vertical section extending generally perpendicular to said first section.

7. The splice sleeve as claimed in claim 1 wherein said first tension bar is generally "L"-shaped having a first horizontal portion for engaging said second portion of said first guide rail and a second vertical section extending therefrom.

8. The splice sleeve as claimed in claim 1 wherein said second tension bar is generally "L"-shaped having a first horizontal portion for engaging said second portion of said second guide rail and a second vertical section extending therefrom.

9. The splice sleeve of claim 1 wherein at least one of the first and second connectors includes a hand adjustable device.

10. The splice sleeve of claim 9 wherein the hand adjustable device includes a bolt and a threaded handle member for engagement with said bolt.

11. A splice sleeve as claimed in claim 1, further including a guide rail extension member removably connectable to said central member and spanning at least a gap between said first and second tension bars along said central member.

12. A splice sleeve for independently adjustably connecting sequential first and second guide rails, comprising:

first, second and third guide rail engaging members, said first and second members cooperating to define a first guide rail channel in which a first guide rail may be positioned, and said first and third members cooperating to define a second guide rail channel in which a second guide rail may be positioned, said first guide rail channel being substantially co-linear with said second guide rail channel along a longitudinal axis;

means for adjusting the first guide rail within said first channel; and means for adjusting the second guide rail within said second channel.

13. A splice sleeve as claimed in claim 12, wherein said first member comprises an elongate "L"-shaped member and said second and third members comprise first and second "L"-shaped bars, respectively.

14. A splice sleeve as claimed in claim 13, wherein said means for adjusting the first guide rail comprises means for removably fastening said first member to said second member.

15. A splice sleeve as claimed in claim 14, wherein said first and second members have overlapping sections when engaged with said means for removable fastening.

16. A splice sleeve as claimed in claim 13, wherein said means for adjusting the second guide rail comprises means for removably fastening said first member to said third member.

17. A splice sleeve as claimed in claim 16, wherein said first and third members have overlapping sections when engaged with said means for removable fastening.

18. A method of adjusting a first guide rail segment in a splice sleeve while a second guide rail segment remains firmly secured in the splice sleeve, comprising the steps of:

providing a central member, a first tension bar, and a second tension bar, the central member and the first tension bar cooperating to define a first guide rail channel, and the central member and the second tension bar cooperating to define a second guide rail channel, the first and second guide rail channels being substantially co-linear along a longitudinal axis;

positioning an end portion of said first guide rail in said first channel;

positioning an end portion of said second guide rail in said second channel;

adjusting said first tension member with respect to said central member to secure said first guide rail in said first channel; and adjusting said second tension member with respect to said central member to secure said second guide rail in said second channel.

19. The method in accordance with claim 18 further including the step of adjusting a relative position of said first tension member with respect to said central member to disengage said first guide rail from said first tension bar and central member.

20. The method in accordance with claim 18, further including the step of adjusting a relative position of said second tension member with respect to said central member to disengage said second guide rail from said second tension bar and central member.

21. The method in accordance with claim 18, wherein each adjusting step comprises tightening a fastener.

22. The splice sleeve of claim 1 wherein the respective ends of the first and second tension bars are not in contact with each other when connected to the central member.

* * * * *